United States Patent [19]
Yamamoto

[11] Patent Number: 6,011,902
[45] Date of Patent: Jan. 4, 2000

[54] MOTOR CONTROL CIRCUIT

[75] Inventor: Seiichi Yamamoto, Kyoto, Japan

[73] Assignee: Rohm Co., Ltd., Kyoto, Japan

[21] Appl. No.: 08/884,553

[22] Filed: Jun. 27, 1997

[30] Foreign Application Priority Data

Jun. 27, 1996 [JP] Japan .................................. 8-167735

[51] Int. Cl.[7] ............................................ G05F 1/10
[52] U.S. Cl. ...................... 388/815; 388/822; 388/910; 318/677; 318/632
[58] Field of Search ............................ 388/800–824, 388/900; 318/637–638, 671, 677–682, 632

[56] References Cited

U.S. PATENT DOCUMENTS

| | | | |
|---|---|---|---|
| 4,350,943 | 8/1982 | Pritchard | 318/432 |
| 4,933,614 | 6/1990 | Kawata | 388/821 |
| 5,020,125 | 5/1991 | Losic et al. | 318/811 |
| 5,086,492 | 2/1992 | Kent | 388/815 |
| 5,338,977 | 8/1994 | Carobolante | 388/815 |

*Primary Examiner*—David Martin
*Attorney, Agent, or Firm*—Nikaido Marmelstein Murray & Oram LLP

[57] ABSTRACT

In an optical disc player, as signals are read from and written to an optical disc, the optical disc is rotated by a spindle motor and an optical pickup is moved by a sled motor. These motors are both direct-current motors. The motor control circuit of the invention uses a drive circuit based on the BTL method, and additionally uses a resistor that is connected in series with the direct-current motor between the output terminals of the drive circuit. The voltage drop across the resistor is fed back, as positive feedback, to the drive circuit through a feedback amplifier. Since, when the motor is started up, a high current flows through the motor and thus a large voltage drop occurs across the resistor, a high feedback voltage is obtained and thus a high drive voltage is applied to the motor.

3 Claims, 4 Drawing Sheets

MOTOR CONTROL CIRCUIT

BACKGROUND OF THE INVENTION

1. Field of the Invention

The present invention relates to a motor control circuit for controlling a direct-current motor by use of a drive circuit based on the BTL (balanced transformer less) method.

2. Description of the Prior Art

Optical disc players include players for CDs (compact discs), CD-ROMs, DVDs (digital video discs), DVD-ROMs, SD-ROMs (super-density ROMs), LDs (laser discs), MDs (minidiscs), and similar optical discs. In optical disc players, as signals are read from or write to an optical disc, the optical disc is rotated by a spindle motor, and an optical pickup is moved by a sled motor.

Conventional optical disc players employ a drive circuit based on the BTL method as shown in FIG. 1. In FIG. 1, the direct-current motor 101, which is a motor having brushes, corresponds to a spindle motor or sled motor used in an optical disc player. Typically, an optical disc player is provided with separate drive circuits to control a spindle motor and a sled motor independently.

The drive circuit 92 shown in FIG. 1 operates as follows. The drive circuit 92 receives at its input terminal 105 a control voltage from a servo IC 91. The control voltage is fed through a resistor Rin to the inverting input terminal (−) of an operational amplifier 103. The operational amplifier 103 receives at its non-inverting input terminal (+) a reference voltage (Vref). The voltage difference between the control voltage and the reference voltage (Vref) is represented by Vin. The operational amplifier 103 has a feedback resistor RNF connected between its inverting input terminal (−) and output terminal, so that the output voltage of the operational amplifier 3 is $$V1 = -(RNF/Rin)Vin + Vref.$$

This voltage V1 is fed through a resistor R to the inverting input terminal (−) of another operational amplifier 102. The operational amplifier 102 receives at its non-inverting terminal (+) the reference voltage (Vref). Moreover, the operational amplifier 102 has a feedback resistor R connected to its inverting input terminal (−), so that the output voltage of the operational amplifier 102 is $$V2 = -(V1 - Vref).$$

This voltage V2 is output via an output terminal 106. On the other hand, the voltage V1 is outputted via another output terminal 107. The motor 101 is connected between these output terminals 106 and 107. Thus, when a voltage Vout is applied to the motor 101, the motor 101 rotates. Here, Vout is expressed as $$\begin{aligned} Vout &= V2 - V1 \\ &= -(V1 - Vref) + (RNF/Rin)Vin - Vref \\ &= 2(RNF/Rin)Vin. \end{aligned}$$

Accordingly, the voltage Vout applied to the motor 101 varies according as the voltage Vin varies, and this voltage Vin varies according as the control voltage fed from the servo IC 91 varies. In some applications, the servo IC 91 is controlled by instructions given from software running on a microcontroller 90.

As shown in the broken-line square 125, the motor 101 can be regarded as equivalent to a circuit composed of armature resistance Ra and back electromotive force (voltage) Ea connected in series. Here, the back electromotive force Ea is proportional to the rotation rate N (i.e. number of revolutions per unit time) of the motor 101. Accordingly, the current that flows through the motor 101 is expressed as $$Ia = (Vout - Ea)/Ra, \quad (1)$$

and the back electromotive force Ea, which is proportional to the rotation rate N, is expressed as $$Ea = K \cdot \Phi \cdot N.$$

(Here, K is the constant of proportionality, and $\Phi$ is the effective magnetic flux per pole.) Hence, the rotation rate N is expressed as $$N = Ea/(K \cdot \Phi). \quad (2)$$

Further, from expressions (1) and (2), the following expression is obtained:

$$N = (Vout - Ia \cdot Ra)/(K \cdot \Phi). \quad (3)$$

As described above, the voltage Vout applied to the motor 101 is controlled in accordance with the control voltage from the servo IC 91. However, as expression (3) indicates, this does not mean that the rotation rate N is directly controlled in accordance with the control voltage; in reality, it is controlled as follows. Consider, for example, a transient state of the motor 101, as when the motor has just been started up. When the motor 101, after having been completely at rest, receives a voltage Vout and thus starts to rotate, the back electromotive force Ea does not appear at first. Accordingly, at this time, the current Ia is larger than predicted from expression (1), and thus the rotation rate N is lower than predicted from expression (3). Then, gradually, the rotation rate N increases, and the current Ia decreases accordingly, until the motor comes to rotate at a constant rotation rate N.

In an optical disc player, in order to improve the rate at which signals are read from or written to an optical disc, it is essential to improve the response of the motor 101.

However, in conventional optical disc players employing the drive circuit 92, only the voltage Vout to be applied across the motor 101 can be controlled. As a result, the response cannot be improved beyond limits imposed by factors such as the inertia of the motor 101. To overcome this problem, in conventional optical disc players, it is customary to force the microcontroller 90 to vary the control voltage disproportionately when the rotation rate of the motor 101 needs to be varied greatly, as when the motor 1 has just been started up. For example, it is possible to start up the motor 101 more quickly by forcing the microcontroller 90 to demand a disproportionately high control voltage to obtain an accordingly higher output voltage Vout. However, such control requires the microcontroller 90 to perform complicate operations. Moreover, raising the control voltage means increasing the gain and thus tends to result in unstable operation of the drive circuit 92 due to oscillation or other undesirable condition. Accordingly, the gain cannot be increased beyond a certain limit.

Furthermore, when the load of the motor 101 as seen from the output terminals 106 and 107 varies, this drive circuit 92 cannot cope with it. To solve this problem, in conventional optical disc players, as the microcontroller 90 reads signals from the optical disc, it checks whether those signals have been read correctly, and instructs the servo IC 91 to adjust the control voltage appropriately. However, to achieve this, the microcontroller 90, the servo IC 92, and the drive circuit 92 all need to be involved in the control of the motor 101. Such control requires complicate operations, and thus the response cannot be improved beyond a certain limit.

Ideally, the motor 101 should be controlled by directly controlling its rotation rate N. In addition, the motor 101 needs to reach the desired rotation rate N as quickly as possible. However, in conventional optical disc players employing the drive circuit 92, the rotation rate N cannot be controlled directly. As a result, the response cannot be improved beyond a certain limit. Moreover, the drive circuit 92 cannot cope with variation in the load. As a result, the microcontroller 90 and the servo IC 91 need to perform complicate operations, and thus, also for this reason, the response cannot be improved beyond a limit.

SUMMARY OF THE INVENTION

An object of the present invention is to improve the rate at which signals are read from and written to an optical disc in an optical disc player by improving the response of motors used there.

To achieve the above object, according to one aspect of the present invention, a motor control circuit for controlling a direct-current motor is provided with an input terminal for receiving a control voltage for controlling the motor; an amplifier for amplifying the control voltage received via the input terminal; a first output terminal for outputting the amplified control voltage; inverting means for inverting the amplified control voltage; a second output terminal for outputting the inverted control voltage; a resistor connected in series with the motor between the first and second output terminal; and a feedback circuit for feeding a voltage across the resistor back to an input terminal of the amplifier as positive feedback.

According to another aspect of the present invention, a motor control circuit for controlling a direct-current motor is provided with a drive circuit for driving the direct-current motor by a BTL method; a resistor connected in series with the direct-current motor; and a feedback circuit for feeding a voltage drop across the resistor back to the drive circuit as positive feedback.

According to still another aspect of the present invention, a motor control circuit for use in an optical disc player for controlling a direct-current motor is provided with a drive circuit for driving the direct-current motor by a BTL method; a resistor connected in series with the direct-current motor; and a feedback circuit for feeding a voltage drop across the resistor back to the drive circuit as positive feedback. Here, two control systems each comprising the BTL-method-based drive circuit, the resistor, and the feedback circuit are provided and are integrated together with a tracking circuit and a focusing circuit into an integrated circuit, so that one of the control systems is used to control a spindle motor and the other is used to control a sled motor.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings.

<First Embodiment>

Figure 1:
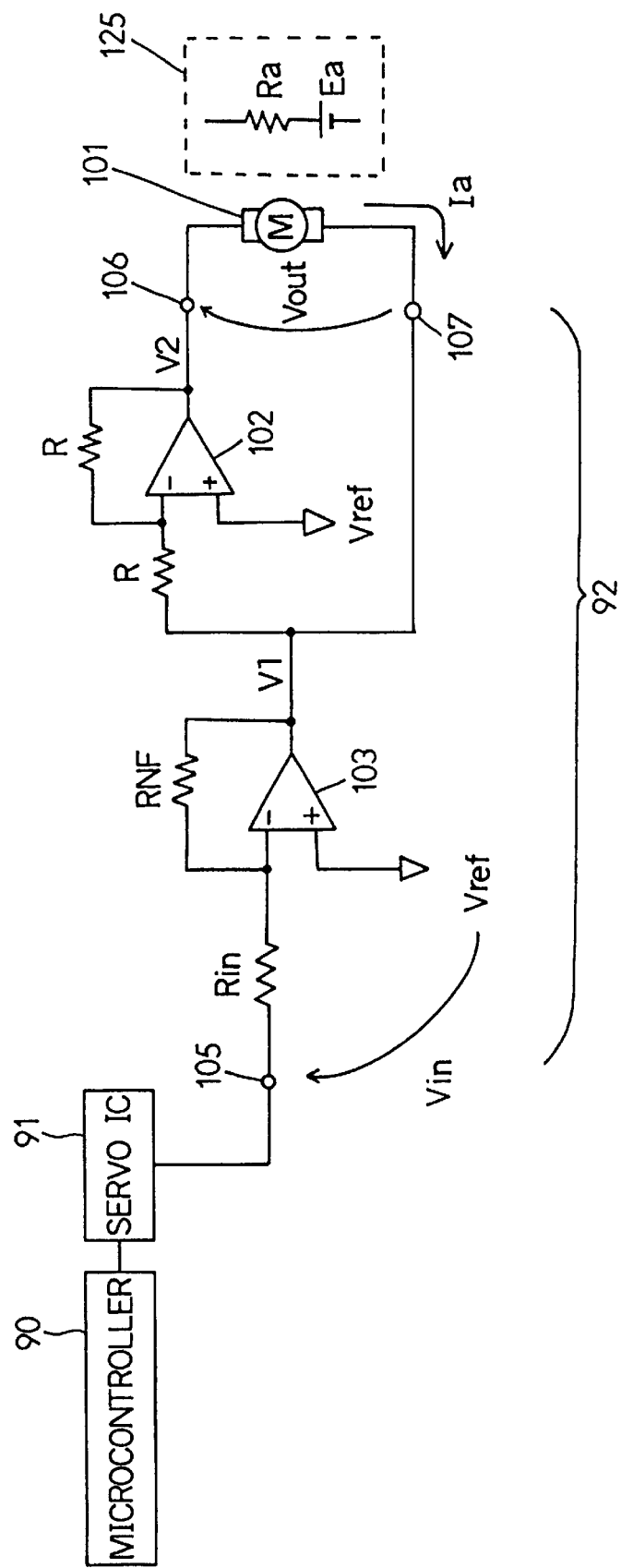
FIG. 1 is a circuit diagram of a conventional motor control circuit.
Figure 2:
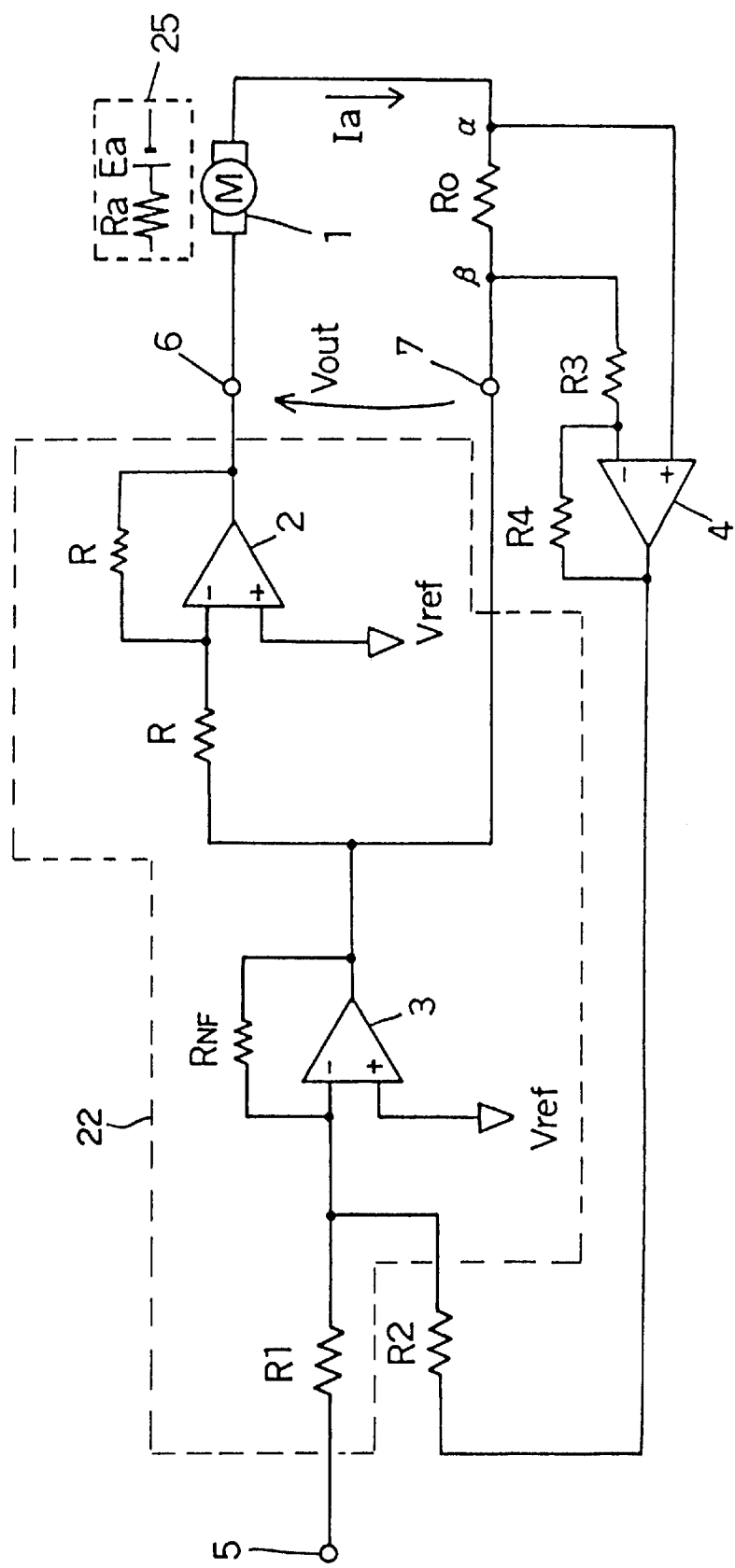
FIG. 2 is a circuit diagram of a motor control circuit as a first embodiment of the present invention.

FIG. 2 is a circuit diagram of a motor control circuit as a first embodiment of the present invention. In this embodiment, the BTL-type drive circuit 92 shown in FIG. 1 as used in conventional optical disc players is further provided with a detection resistor RO connected in series with the motor 1, so that part of the voltage drop across this resistor Ro is fed, as positive feedback, to the inverting input terminal (−) of the operational amplifier 3 through another operational amplifier 4 serving as a feedback amplifier.

Numeral 5 represents an input terminal to which a control voltage for controlling the motor is supplied from a servo IC or the like. The control voltage supplied to the input terminal 5 is then fed through a resistor R1 to the inverting input terminal (−) of the operational amplifier 3. The operational amplifier 3 receives at its non-inverting input terminal (+) a reference voltage Vref, has a feedback resistor $R_{NF}$ connected between its output terminal and inverting input terminal (−), and receives at its inverting input terminal (−) the output of the operational amplifier 4 through a resistor R2.

The output terminal of the operational amplifier 3 is connected to the output terminal 7 of the drive circuit, and is also connected through a resistor R to the inverting input terminal (−) of still another operational amplifier 2. The operational amplifier 2 receives at its non-inverting input terminal (+) the reference voltage Vref, and has a feedback resistor R connected between its output terminal and inverting input terminal (−). This feedback resistor R has the same resistance as the resistor connected between the inverting input terminal of the operational amplifier 2 and the output terminal of the operational amplifier 3. For this reason, these two resistors are represented by the same symbol R. Numeral 6 represents another output terminal of the drive circuit 22. The motor 1 and the detection resistor Ro are connected between the two output terminals 6 and 7 of the drive circuit 22. An equivalent circuit of the motor 1 is shown in the broken-line square 25, where Ra represents the armature resistance, and Ea represents the back electromotive force (voltage). Ia represents the current that flows through the motor 1. As this current Ia flows, a voltage is developed across the detection resistor Ro, and this voltage is fed to the operational amplifier 4. Specifically, the node α at one end of the detection resistor Ro is connected to the non-inverting terminal (+) of the operational amplifier 4, and the node β at the other end is connected through a resistor R3 to the inverting terminal (−) of the operational amplifier 4.

The operational amplifier 4 has a feedback resistor R4 connected between its output terminal and inverting input terminal (−), so that part of the voltage drop developed across the detection resistor Ro (i.e. the voltage across the detection resistor RO) is fed, as positive feedback, to the operational amplifier 3 through the operational amplifier 4 and the resistor R2. In this way, this embodiment uses positive feedback of a voltage.

In the conventional drive circuit shown in FIG. 1, it is the voltage Vout between the output terminals 106 and 107 that is controlled by the control voltage received at the input terminal 105. In this embodiment, the voltage Vout between the output terminals 6 and 7 is further varied in accordance with the current Ia flowing through the motor 1, so that the rotation rate of the motor 1 is controlled directly by the control voltage received at the input terminal 5. As a result, the rotation rate of the motor 1 does not vary so much even when the load as seen from the output terminals 6 and 7 varies, and thus the motor 1 can reach the desired rotation rate more quickly.

For example, consider the start-up state of the motor 1 where the motor 1 at rest has just been started so as to reach a given rotation rate. At first, only small back electromotive force Ea occurs, and accordingly the current Ia is relatively large. As a result, the voltage across the detection resistor Ro rises in proportion to the current Ia. This voltage is amplified by the operational amplifier 4, and accordingly the voltage supplied as positive feedback to the operational amplifier 3 rises in proportion to the current Ia. This rise in the voltage at the inverting input terminal (−) of the operational amplifier 3 causes the voltage Vout to rise, and thus the motor reaches the desired rotation rate more quickly. In addition, the microcontroller or servo IC (neither is shown) does not need to perform complicate operations, and therefore the control of the motor 1 can be realized with simple circuits.

In this way, the response of the motor 1 is improved. This contributes, with a spindle motor, to quicker start-up and reduced variation in the rotation rate, and, with a sled motor, to quicker movement of the optical pickup. As a result, the optical disc player can read signals from or write them to an optical disc at a higher rate. Note that, in this embodiment, oscillation is prevented by designing the drive circuit to have a gain lower than an amplification factor of one (i.e. 0 dB) at a phase of 180°.

<Second Embodiment>

Figure 3:
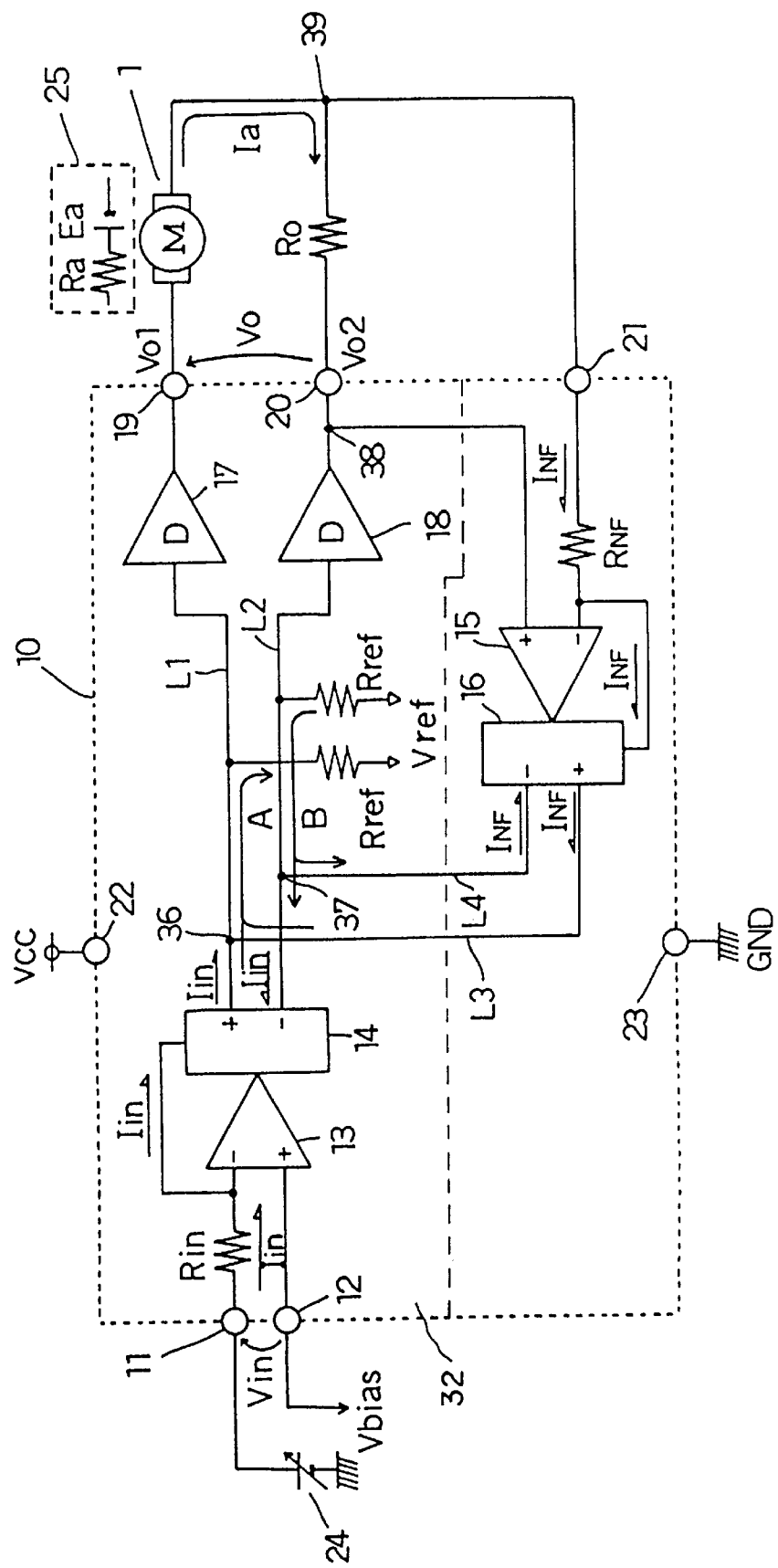
FIG. 3 is a circuit diagram of another motor control circuit as a second embodiment of the present invention.

FIG. 3 is a circuit diagram of another motor control circuit as a second embodiment of the present invention. In this embodiment, the drive circuit 32 is formed in an integrated circuit 10. A motor 1 and a detection resistor Ro are connected in series between output terminals 19 and 20 of the drive circuit 32, and a control voltage 24 is supplied to an input terminal 11 of the drive circuit. The rotation rate of the motor 1 is controlled by varying the control voltage 24, which is fed from a servo IC or microcontroller (neither is shown).

The drive circuit also receives a bias voltage Vbias at another input terminal 12. The bias voltage Vbias is set, for example, to 2.5 V. Thus, a voltage difference Vin occurs between the two input terminals 11 and 12. The control voltage 24 received at the input terminal 11 is fed through a resistor Rin to the inverting input terminal (−) of an operational amplifier 13, and the bias voltage Vbias is fed to the non-inverting input terminal (+) of the operational amplifier 13. As a result, a current Iin flows through the resistor Rin. The current Iin is expressed as $$Iin=Vin/Rin. \quad (4)$$

This current Iin is fed to a current switching circuit 14. The current switching circuit 14 outputs a current Iin via its plus terminal (+), and receives a current Iin via its minus terminal (−). Here, the combination of the operational amplifier 13 and the current switching circuit 14 serves as a kind of voltage-controlled current source circuit that outputs a current ±Iin in proportion to the voltage Vin it receives; or it may be regarded as a voltage-to-current conversion circuit.

The plus terminal (+) of the current switching circuit 14 is connected, via a line L1, to a drive buffer 17, which is a buffer circuit having an amplification factor of approximately one and having a sufficiently high impedance. Accordingly, as indicated by arrow A, the current Iin output from the current switching circuit 14 via its plus terminal (+) flows, together with a current $I_{NF}$ (described later) added thereto at a node 36, through a resistor Rref into the source of a reference voltage Vref. Therefore, the voltage Vo1 appearing at one output terminal 19 is expressed as $Vo1=(Iin+I_{NF})Rref+Vref$.

On the other hand, the minus terminal (−) of the current switching circuit 14 is connected, via a line L2, to another drive buffer 18, which is a buffer circuit of the same type as the drive buffer 17. Accordingly, as indicated by arrow B, the current Iin flowing into the current switching circuit 14 via its minus terminal (−) is a current fed through a resistor Rref from the source of the reference voltage Vref less a current $I_{NF}$ (described later) that is diverted therefrom at a node 37. Therefore, the voltage Vo2 appearing at the other output terminal 20 is expressed as $$Vo2=Vref-(Iin+I_{NF})Rref.$$

Hence, the voltage Vo between the output terminals 19 and 20 is expressed as $$Vo=Vo1-Vo2=2\ (Iin+I_{NF})Rref. \quad (5)$$

That is, the voltage Vo is applied across the serially connected motor 1 and detection resistor Ro. This voltage Vo is proportional to the current $Iin+I_{NF}$. Here, the drive buffers 17 and 18, together with their respective resistors Rref, each serve as a kind of current-controlled voltage source circuit; or they may be regarded as current-to-voltage conversion circuits. Moreover, the nodes 36 and 37 each serve as a kind of current synthesizer for performing a given operation between the currents Iin and $I_{NF}$. At the node 36, the line L1 is connected to a line L3; at the node 37, the line L2 is connected to a line L4. A node 38 at one end of the detection resistor Ro is connected to the non-inverting input terminal (+) of another operational amplifier 15, and a node 39 at the other end of the detection resistor Ro is connected, via a terminal 21 and then through a resistor $R_{NF}$, to the inverting input terminal (−) of this operational amplifier 15. This resistor $R_{NF}$ is formed within the integrated circuit 10. Now, suppose that a current Ia flows through the motor 1. Then, the current $I_{NF}$ that flows through the resistor RNF is expressed as $$I_{NF}=(Ia \cdot Ro)/R_{NF} \quad (6)$$

Here, the current $I_{NF}$ is assumed to be substantially smaller than the current Ia. A simple way to achieve this is to make the resistance of the detection resistor Ro as small as practicable.

The current $I_{NF}$ is fed to a current switching circuit 16. The current switching circuit 16 outputs a current $I_{NF}$ via its plus (+) terminal, and receives a current $I_{NF}$ via its minus (−) terminal. Also here, the combination of the operational amplifier 15 and the current switching circuit 16 serves as a kind of voltage-controlled current source circuit. As mentioned previously, the current $I_{NF}$ from the plus terminal (+) of the current switching circuit 16 is fed via line L3 to the node 36, and the current $I_{NF}$ from the node 37 is fed via line L4 to the minus (−) terminal of the current switching circuit 16. In this way, positive feedback of the current $I_{NF}$ is achieved. From expressions (4) to (6) above, the voltage Vo is expressed as $$Vo=2(Vin/Rin+Ia \cdot Ro/R_{NF})Rref. \quad (7)$$

As described earlier, the motor 1 can be regarded as equivalent to a circuit 25 composed of armature resistance Ra and back electromotive force Ea connected in series. Accordingly, with respect to the motor 1, the voltage Vo is expressed as $$Vo = Ea + (Ra + Ro)Ia. \tag{8}$$

From expressions (7) and (8), the back electromotive force Ea is expressed as $$Ea = 2(Rref / Rin)Vin +$$
$$\{(2Rref / R_{NF} - 1)Ro - Ra\}Ia.$$

As expression (2) indicates, the electromotive force Ea is proportional to the rotation rate N. Accordingly, in order to control the electromotive force Ea by varying the voltage Vin, the following condition needs to be satisfied:

$$(2Rref/R_{NF}-1)Ro-Ra=0$$

In this way, the rotation rate N is controlled directly by varying the voltage Vin. This makes it easy to determine the voltage Vin corresponding to a given rotation rate N and thus helps simplify the control of the motor 1. Moreover, simply by keeping the voltage Vin constant, the back electromotive force Ea is kept constant by feedback. This helps reduce variation in the rotation rate N that occurs when the load as seen from the output terminals 19 and 20 varies. Furthermore, the voltage Vo is controlled in such a way that its change is directly reflected in the rotation rate N. This enables the motor 1 to reach the desired rotation rate more quickly. Moreover, only a control voltage 24 corresponding to the desired rotation rate N needs to be fed from an external circuit such as a microcontroller or servo IC (neither is shown). This eliminates the need for the microcontroller or servo IC (neither is shown) to perform special operations, and thus allows the motor 1 to be controlled with simple circuits. This embodiment uses positive feedback of a current.

The integrated circuit 10 is, via its terminal 22, connected to a power source voltage VCC on which it operates, and, via a terminal 23, connected to ground (GND). In cases where the motor 1 is a sled motor, the control voltage 24 is switched between positive and negative voltages to control the rotation direction of the motor 1. The present invention ensures quicker movement of the optical pickup (not shown) and thus faster writing and reading of signals.

<Third Embodiment>

Figure 4:
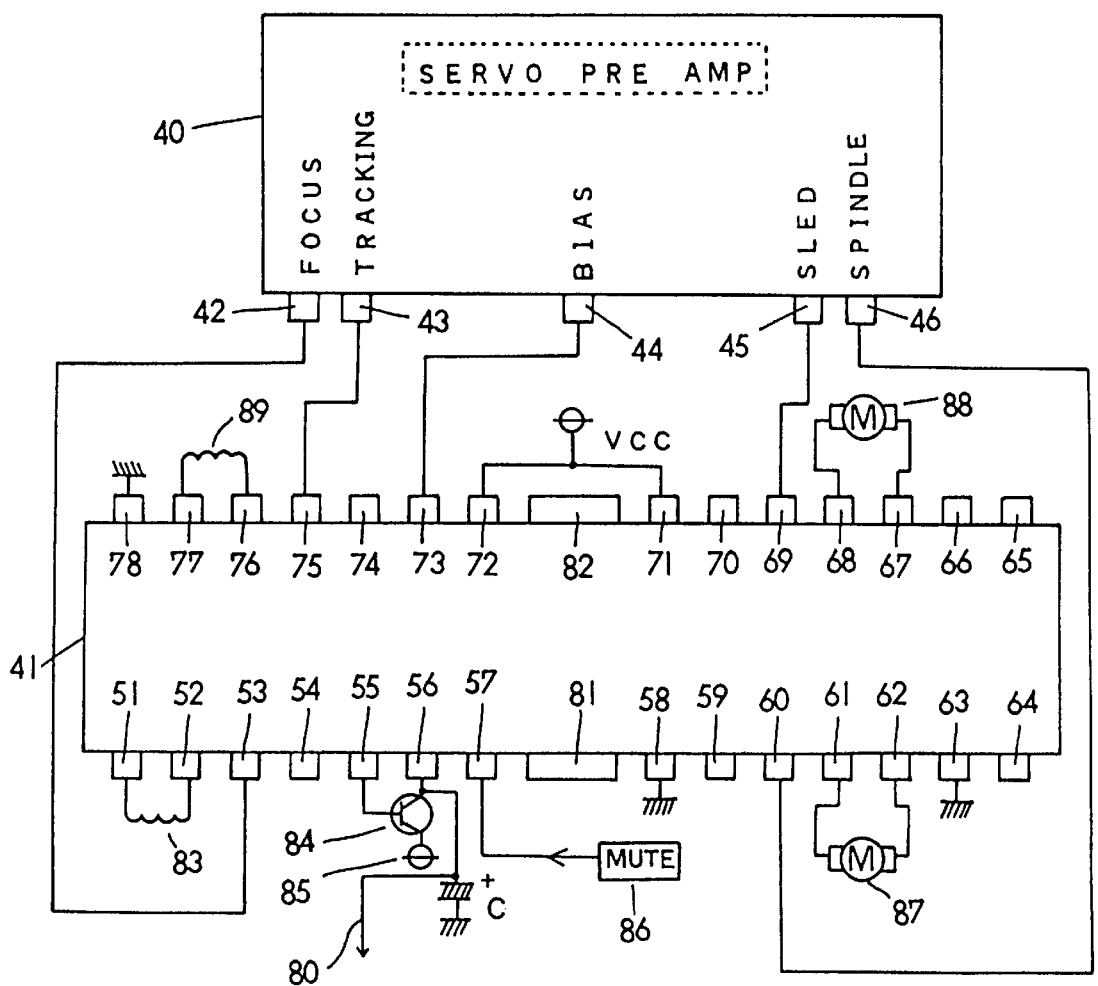
FIG. 4 is a circuit diagram of a relevant portion of an optical disc player as a third embodiment of the present invention.

FIG. 4 is a circuit diagram of a relevant portion of an optical disc player as a third embodiment of the present invention. In this embodiment, the motor control circuit of the first or second embodiment is incorporated in a semiconductor device 41. More specifically, as described later, the semiconductor device 41 incorporates two motor control circuits, a focusing circuit, and a tracking circuit formed as an integrated circuit. Of the two motor control circuits incorporated in the semiconductor device 41, one is for driving a spindle motor 87, which is connected to the terminals 61 and 62 of the semiconductor device 41, and the other is for driving a sled motor 88, which is connected to the terminals 67 and 68 of the semiconductor device 41. The drive circuits used here are both of the type that performs positive feedback control by use of a detection resistor as described earlier. Note, however, that the detection resistors for detecting the currents flowing through the motors 87 and 88 are incorporated in the semiconductor device 41.

A bias voltage (BIAS) is obtained from a servo preamplifier 40 via its terminal 44, and is fed to the terminal 73 of the semiconductor device 41. This bias voltage (BIAS) is used by both of the motor control circuits for the motors 87 and 88. A control voltage (SPINDLE) for controlling the rotation rate of the spindle motor 87 is obtained from the servo preamplifier 40 via its terminal 46, and is fed to the terminal 60 of the semiconductor device 41. A control voltage (SLED) for controlling the rotation rate of the sled motor 88 is obtained from the servo preamplifier 40 via its terminal 45, and is fed to the terminal 69 of the semiconductor device 41.

In an optical disc player, a laser beam needs to be kept focused on the surface of an optical disc (not shown). To control such focusing, the servo preamplifier 40 monitors the vibration of the optical disc, and outputs a focusing control signal (FOCUS) via its terminal 42. The focusing control signal (FOCUS) is fed to the terminal 53 of the semiconductor device 41. In accordance with the focusing control signal (FOCUS), the focusing circuit incorporated in the semiconductor device 41 controls focusing by supplying an appropriate current to a focus coil 83, which is connected to the terminals 51 and 52.

Moreover, in an optical disc player, the focus of the laser beam needs to be kept on a track formed on the optical disc. To control such tracking, the servo preamplifier 40 monitors the deviation of the laser beam, and outputs a tracking control signal (TRACKING) via its terminal 43. The tracking control signal (TRACKING) is fed to the terminal 75 of the semiconductor device 41. In accordance with the tracking control signal (TRACKING), the tracking circuit incorporated in the semiconductor device 41 controls tracking by supplying an appropriate current to a tracking coil 89, which is connected to the terminals 76 and 77.

Moreover, the semiconductor device 41 is, via its terminals 71 and 72, connected to a power source voltage VCC on which it operates, and, via its terminals 58, 63, and 78, connected to ground; the terminals 54, 59, 64, 65, 66, 70, 74 are unused. Further, the semiconductor device 41 has its terminals 55 and 56 connected to the base and collector, respectively, of a transistor 84, whose emitter is connected to a reference voltage 85. From the collector of this transistor 84, an adjustment signal 80 is extracted. For phase compensation, a capacitor C is connected between the collector of the transistor 84 and ground. This capacitor C has a capacitance of, for example, 22 µF.

In some applications, the semiconductor device 41 receives, via its terminal 57, a stop signal that is fed from a MUTE switch 86. The stop signal is a signal that is either in a high-level or low-level state at a time. When the stop signal becomes low, reading or writing of signals from or to the optical disc is halted temporarily, and, when the stop signal becomes high, reading or writing of signals is resumed.

As described above, by additionally providing a detection resistor and a feedback amplifier to a BTL-type drive circuit so that it can perform positive feedback control, the rotation rate of a direct-current motor can be controlled directly. This not only enables the motor to reach the desired rotation rate more quickly, but also reduces variation in the rotation rate due to variation in the load. Moreover, the drive circuit then requires only a control voltage from an external control circuit such as a microcontroller or servo IC, and therefore such an external circuit does not need to be designed for special control. This makes it easy to control the rotation rate of the motor. In an optical disc player, such improvement in the response of motors leads to quicker start-up of disc rotation and to quicker movement of the optical pickup, and thus helps achieve faster reading and writing of signals from and to the optical disc. In addition, reduction in variation of the rotation rate of motors contributes to stable operation of the motors.

In particular, according to the third embodiment of the present invention, all the circuits necessary for the rotation of the optical disc and for the movement and adjustment of the optical pickup are integrated into one integrated circuit, so that related signals can be processed at one place. Since various control signals often work in interrelated ways, processing them in one integrated circuit helps simplify the internal construction and wiring of the optical disc player. In addition, improved response of the spindle motor and the sled motor ensures faster reading and writing of signals.

What is claimed is:

1. A motor control circuit for controlling a direct-current motor, comprising:
   an input terminal for receiving a control voltage for controlling the motor;
   a first amplifier, connected to said input terminal, for amplifying the control voltage received via the input terminal;
   a first output terminal, connected to said first amplifier, for outputting the amplified control voltage;
   second amplifier, connected to said first amplifier, for inverting the amplified control voltage;
   a second output terminal, connected to said second amplifier, for outputting the output of the second amplifier;
   a resistor connected in series with the motor, said resistor and motor connected between the first and second output terminals; and
   a positive feedback circuit for feeding a voltage across the resistor back to an input terminal of the first amplifier as positive feedback.

2. A motor control circuit as claimed in claim 1,
   wherein the feedback circuit comprises an operational amplifier having two input terminals, one of which being a non-inverting terminal and the other being an inverting terminal, and the resistor is connected between input terminals of the feedback circuit.

3. A motor control circuit for controlling a direct-current motor, comprising:
   a first voltage-to-current conversion circuit that receives a control voltage and a bias voltage and outputs to first and second paths two control currents whose magnitudes are both in proportion to a voltage difference between the control voltage and the bias voltage but whose phases are opposite to each other;
   first and second buffers connected to the first and second paths, respectively;
   a first resistor connected in series with the direct-current motor, said first resistor and direct-current motor connected between output terminals of the first and second buffers;
   a second voltage-to-current conversion circuit, connected to first and second ends of said first resistor, said second voltage-to-current conversion circuit outputs to third and fourth paths two feedback currents whose magnitudes are both in proportion to a voltage drop across the first resistor but whose phases are opposite to each other, the third path being connected to the first path, the fourth path being connected to the second path;
   a second resistor whose one end is connected to a reference voltage and whose other end is connected to t he first path; and
   a third resistor whose one end is connected to the reference voltage and whose other end is connected to the second path,
   wherein currents obtained by synthesizing the currents output from the first and second voltage-to-current conversion circuits flow through the second and third resistors, and voltages produced across the second and third resistors are applied to the first and second buffers.

* * * * *